United States Patent
Kayanuma et al.

(10) Patent No.: US 8,579,335 B2
(45) Date of Patent: Nov. 12, 2013

(54) COUPLING STRUCTURE FOR ABSORPTION REFRIGERATION CIRCUIT

(75) Inventors: Hidetaka Kayanuma, Wako (JP); Hideyuki Akaba, Wako (JP); Kazuma Ichikawa, Wako (JP); Mitsuru Ishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 102 days.

(21) Appl. No.: 12/919,641

(22) PCT Filed: Mar. 10, 2009

(86) PCT No.: PCT/JP2009/054976
§ 371 (c)(1),
(2), (4) Date: Aug. 26, 2010

(87) PCT Pub. No.: WO2009/119360
PCT Pub. Date: Oct. 1, 2009

(65) Prior Publication Data
US 2010/0327578 A1    Dec. 30, 2010

(30) Foreign Application Priority Data

Mar. 26, 2008 (JP) ................................ 2008-080263

(51) Int. Cl.
*F16L 23/00* (2006.01)

(52) U.S. Cl.
USPC ........... 285/368; 285/192; 285/205; 285/208; 285/412; 277/594

(58) Field of Classification Search
USPC ................ 285/368, 412, 189, 192, 205–208; 277/594
See application file for complete search history.

(56) References Cited

U.S. PATENT DOCUMENTS

| | | | | |
|---|---|---|---|---|
| 2,152,630 A | * | 4/1939 | Balfe | 277/594 |
| 2,918,312 A | * | 12/1959 | Filstrup | 285/50 |
| 4,471,968 A | * | 9/1984 | Schlaupitz et al. | 277/592 |
| 4,550,743 A | * | 11/1985 | McFarlane et al. | 137/68.23 |
| 4,721,315 A | * | 1/1988 | Ueta | 277/593 |
| 5,772,252 A | * | 6/1998 | Malani | 285/4 |
| 5,947,527 A | * | 9/1999 | Carter | 285/4 |
| 6,231,049 B1 | * | 5/2001 | Ridgway | 277/595 |
| 6,386,593 B1 | * | 5/2002 | Slais et al. | 285/205 |
| 6,422,573 B1 | * | 7/2002 | Sekioka | 277/594 |
| 6,547,253 B2 | * | 4/2003 | Izumi et al. | 277/594 |
| 6,893,023 B2 | * | 5/2005 | Kato | 277/592 |
| 7,234,705 B2 | * | 6/2007 | Novil et al. | 277/593 |
| 2005/0046120 A1 | * | 3/2005 | Novil et al. | 277/592 |
| 2005/0093248 A1 | * | 5/2005 | Udagawa | 277/594 |

FOREIGN PATENT DOCUMENTS

| | | |
|---|---|---|
| CH | 362 893 | 6/1962 |
| DE | 199 08 017 | 9/2000 |
| JP | 04-060280 | 2/1992 |
| JP | 09-257021 | 9/1997 |
| JP | 2002-130480 | 5/2002 |

* cited by examiner

*Primary Examiner* — Aaron Dunwoody
*Assistant Examiner* — Fannie Kee
(74) *Attorney, Agent, or Firm* — Rankin, Hill & Clark LLP

(57) ABSTRACT

A coupling structure for an absorption refrigeration circuit includes a gasket held between two coupling members. The gasket has a protruding part that elastically deforms when clamped between adjoining faces of the two coupling members.

20 Claims, 7 Drawing Sheets

COUPLING STRUCTURE FOR ABSORPTION REFRIGERATION CIRCUIT

TECHNICAL FIELD

The present invention relates to a coupling structure for a flow path of a refrigerant or an absorbent solution in an absorption refrigeration circuit.

BACKGROUND ART

Absorption refrigeration circuit components are connected using pipe conduits. The pipe conduits and components are welded or brazed together.

However, welding and brazing are labor-intensive, and accordingly not suited to mass production.

Inasmuch, a coupling structure incorporating a metal gasket is known as a method suited to mass production, as disclosed in JP 04-60280 A.

Figure 9:
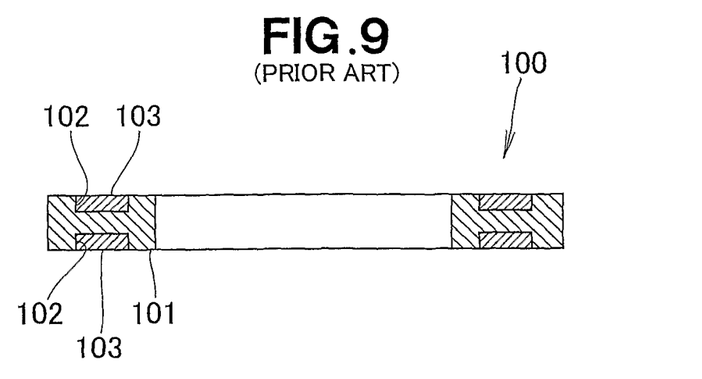
FIG. 9 is a cross-sectional view showing a conventional metal gasket.
Figure 10:
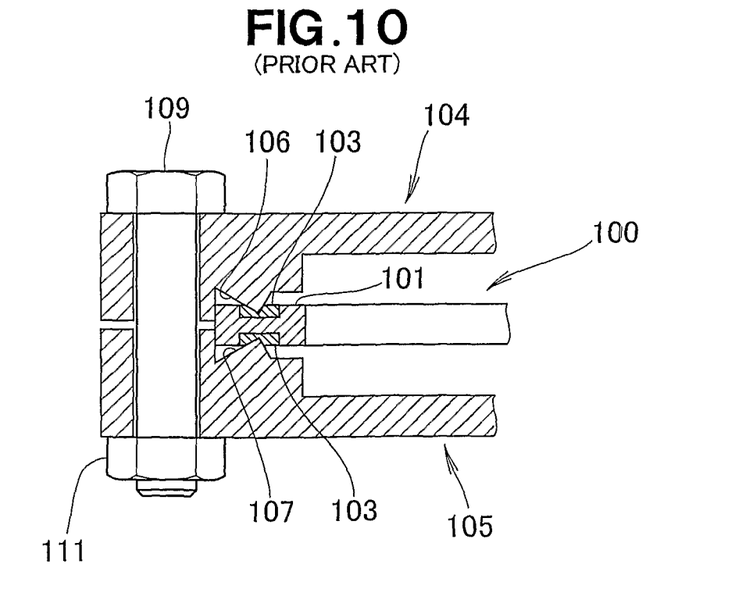
FIG. 10 is a cross-sectional view showing a coupling structure incorporating the conventional metal gasket.

FIGS. 9 and 10 hereof show, respectively, a gasket used in the coupling structure disclosed in JP 04-60280 A, and the coupling structure.

As shown in FIG. 9, a metal gasket 100 comprises an annular base part 101, grooves 102, 102 formed in upper and lower surfaces of the base part 101, and sealing members 103, 103 fitted into the grooves 102, 102.

As shown in FIG. 10, blade parts 106, 107 are formed respectively on upper and lower flanges 104, 105. When a nut 111 is threaded onto a bolt 109, the blade parts 106, 107 engage with the sealing member 103.

In this type of coupling structure the blade parts 106, 107 must be provided to the upper and lower flanges 104, 105. Flanges 104, 105 that are provided with such blade parts 106, 107 are expensive, and using a coupling structure of this type increases the associated manufacturing costs.

DISCLOSURE OF THE INVENTION

It is an object of the present invention to provide a coupling structure capable of being used inexpensively.

According to one aspect of the present invention, there is provided a coupling structure for a flow path of a refrigerant or an absorbent solution in an absorption refrigeration circuit, the structure comprising two coupling members, a gasket held between the two coupling members, and a plurality of bolts for joining the two coupling members together; wherein adjoining faces of the two coupling members are flat surfaces. The gasket has a through-hole through which the refrigerant or absorbent solution is allowed to pass; a protruding part for elastically deforming and pressing against the adjoining faces when clamped between the two coupling members, the protruding part encircling the through-hole; and a plurality of bolt holes disposed outside the protruding part, the bolt holes allowing each of the bolts to pass therethrough.

The protruding part is disposed so as to elastically deform and press against the adjoining faces when clamped between the two coupling members. The protruding part pressing against the adjoining faces can prevent fluid from leaking. As long as the gasket to which the protruding part has been provided is used, fluid can be prevented from leaking. The gasket having a protruding part may be manufactured by pressing metal plates or using other inexpensive means. Specifically, the coupling structure can be manufactured at reduced cost. According to different embodiments, the protruding part may be "V"-shaped or may have a tapering surface.

Each of the bolts preferably comprises a shaft part having a male thread formed on one end thereof; a bolt head integrally formed on the other end of the shaft part; a weak part provided to the shaft part in a vicinity of the bolt head, the weak part breaking when the bolt is fastened at a predetermined torque; and a flanged part provided to the shaft part between the weak part and the thread, the flanged part locking onto an exterior surface of one of the two coupling members.

Accordingly, when the bolt head has been tightened to the predetermined torque, the bolt will break at the weak part. Specifically, the bolt will be tightened at the predetermined torque.

The bolt is generally tightened using a torque wrench; however, according to the present invention, the torque can be controlled without using a torque wrench. Specifically, the bolt will be simple to tighten because a torque wrench does not have to be made available or positioned.

BRIEF DESCRIPTION OF THE DRAWINGS

FIGS. 8A, 8B are schematic views showing an operation of the coupling structure having the gasket according to the third embodiment;

BEST MODE FOR CARRYING OUT THE INVENTION

Several preferred embodiments of the present invention will be described in detail now, by way of example only, with reference to the accompanying drawings.

Figure 1:
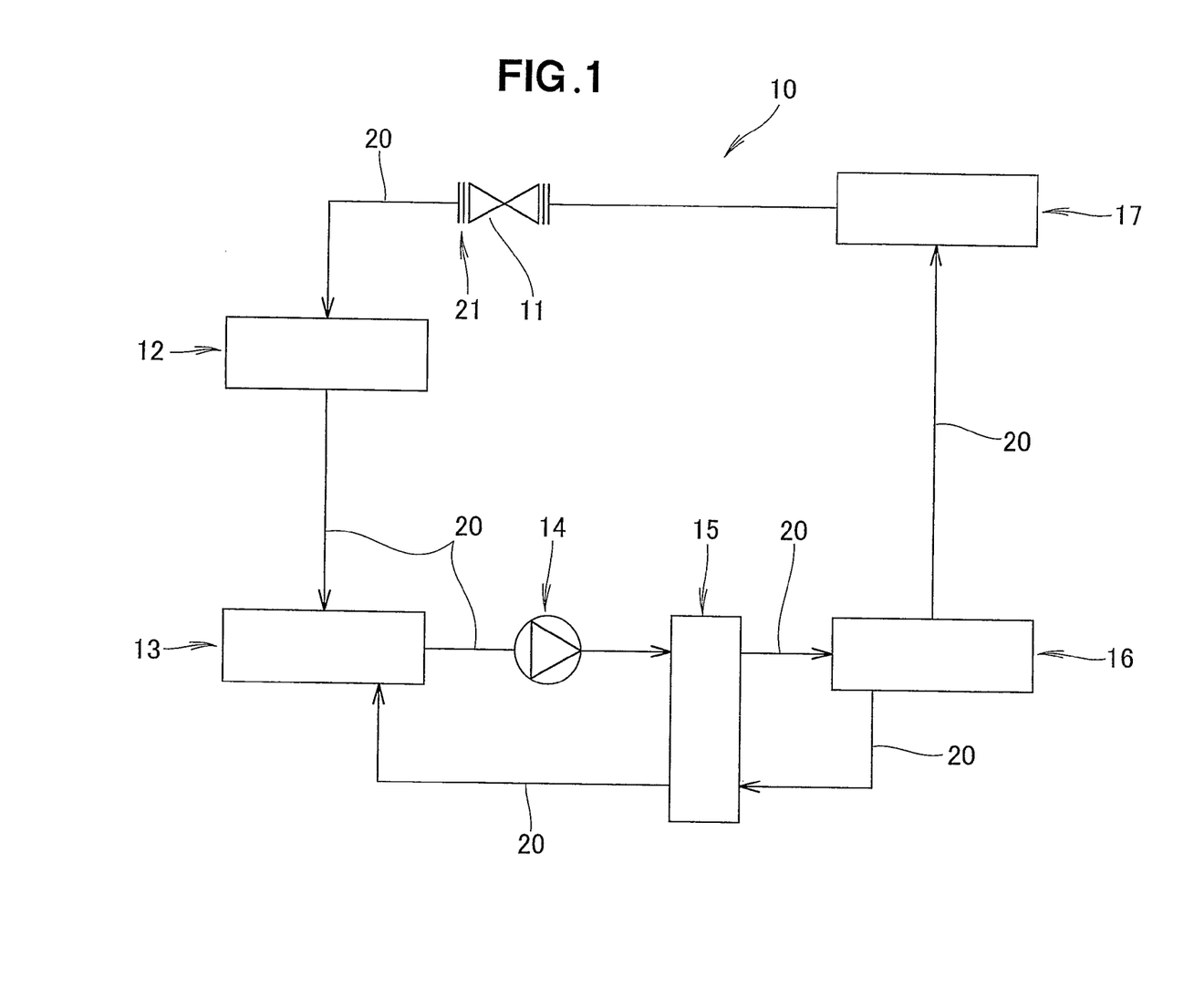
FIG. 1 is a schematic view showing an absorption refrigeration circuit employing a coupling structure according to the present invention.

In FIG. 1, an absorption refrigeration circuit 10 comprises an expansion valve 11 for causing a highly pressurized refrigerant (e.g., trifluoroethanol (TFE) or another fluoroalcohol) to expand and depressurize, an evaporator 12 for causing the refrigerant that has been depressurized using the expansion valve 11 to absorb exterior heat (e.g. inside an automotive vehicle) and evaporate, an absorber 13 for causing the refrigerant vapor generated by the evaporator 12 to be absorbed by an absorbing solution (e.g., a solution that includes dimethylimidazolidinone (a DMI derivative) as an absorbent), and a heat exchanger 15 to which the absorbent solution is fed from the absorber 13 using a pump 14. The absorption refrigeration circuit 10 also includes a regenerator 16 for heating the absorbent solution supplied from the heat exchanger 15 using heat from a heater or other external source, causing the refrigerant to evaporate, and generating a high-temperature, high-pressure refrigerant, and a condenser 17 for discharging into the atmosphere (e.g., the air outside an automotive vehicle) the potential heat of the refrigerant that has been brought to a high temperature and a high pressure by the regenerator 16.

The absorbent solution from which the refrigerant evaporated when heated inside the regenerator 16 flows back to the heat exchanger 15, discharges potential heat into the absorbent solution flowing from the absorber 13, and returns to the absorber 13.

For example, a coupling structure 21 is used as a connecting part between the expansion valve 11 and a pipe conduit 20. The coupling structure 21 is described in detail below.

Figure 2:
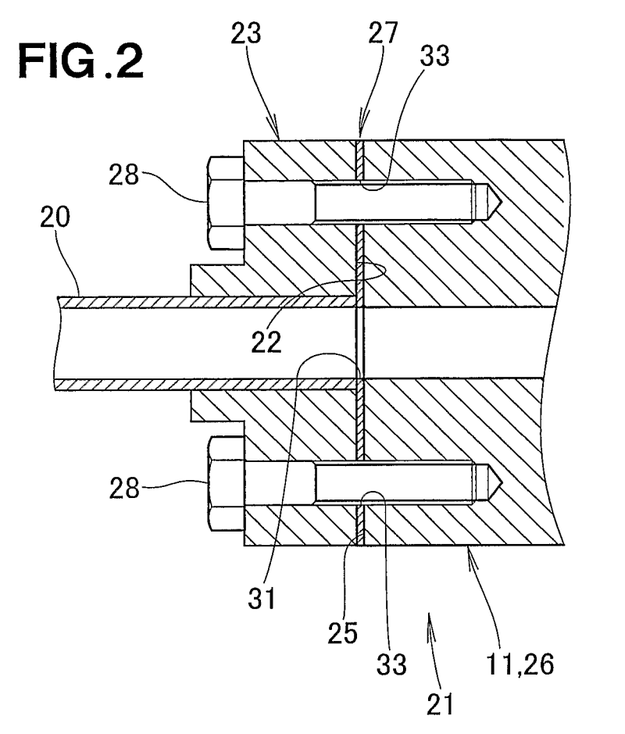
FIG. 2 is a cross-sectional view showing the coupling structure according to a first embodiment of the present invention.

As shown in FIG. 2, the coupling structure 21 comprises a coupling member 23 (e.g. a flange) disposed on a leading end of the pipe conduit 20, and having an adjoining face 22 that is a flat surface, a coupling member 26 (e.g. a boss) disposed on the expansion valve 11, and having an adjoining face 25 that is a flat surface, a gasket 27 held between the coupling members 23, 26, and bolts 28, 28 for fastening the coupling members 23, 26 and the gasket 27 together.

The bolt 28 is preferably fastened at a predetermined torque using a torque wrench.

Figure 3:
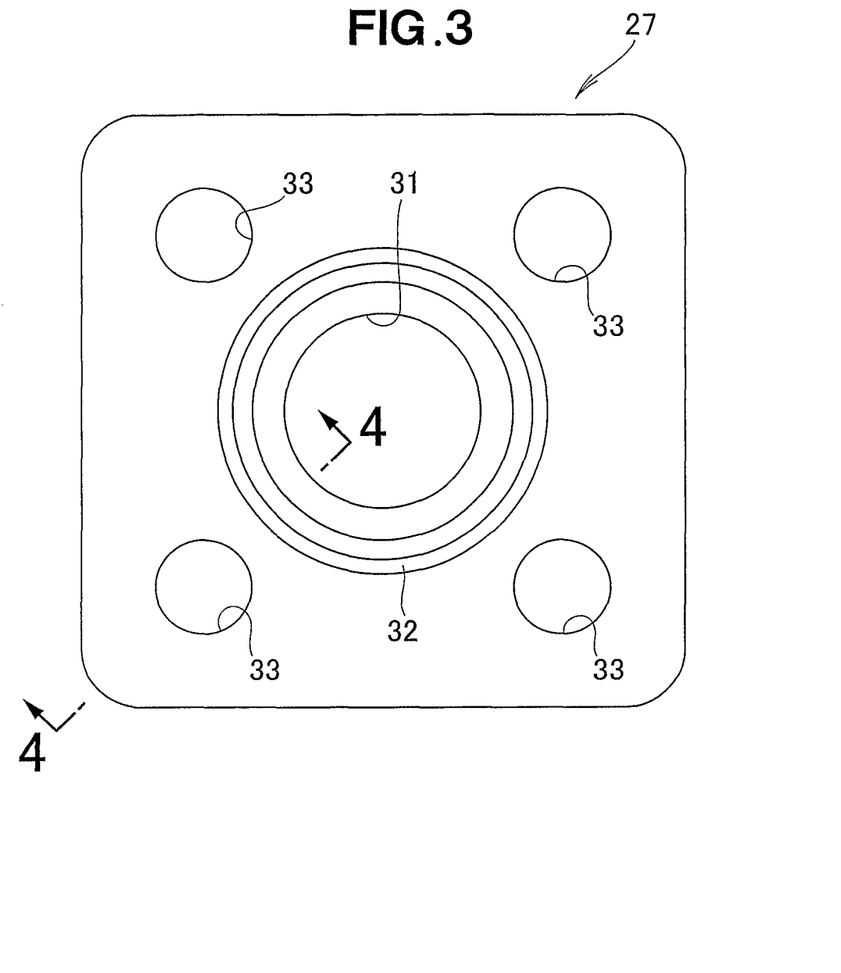
FIG. 3 is a top plan view of a gasket of FIG. 2.

As shown in FIG. 3, the gasket 27 comprises a through-hole 31 through which the refrigerant or absorbent solution is allowed to pass, a protruding part 32 disposed so as to encircle the through-hole 31, and protruding outward in a direction perpendicular with respect to the plane of the drawing, and a plurality of bolt holes 33 disposed outside the protruding part 32.

The gasket 27 is a so-called "square gasket"; however, a round or oblong gasket may also be used. In addition, the gasket 27 is preferably a metal gasket made using Japanese industry standard (JIS) SUS301H or another stainless steel material.

Figure 4:
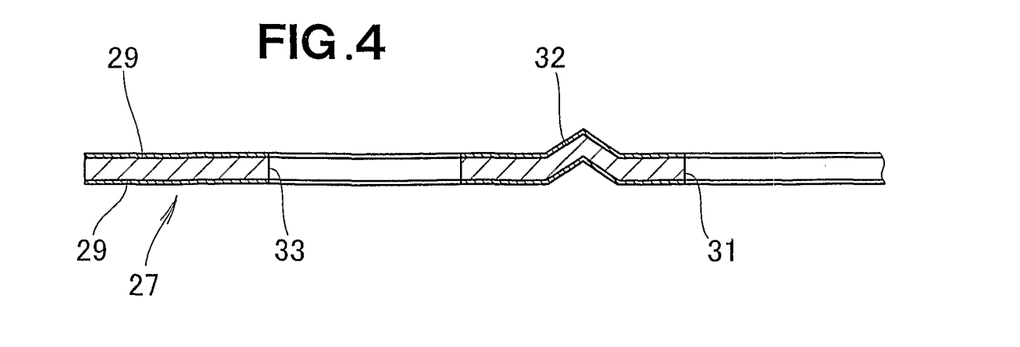
FIG. 4 is a cross-sectional view taken along line 4-4 of FIG. 3.

As shown in FIG. 4, the protruding part 32 is "V"-shaped. Acrylonitrile-butadiene rubber (NBR) or another sealant 29 is provided to both surfaces of the gasket 27. The sealant 29 allows a better seal to be achieved.

At least one type of elastomer from a group consisting of chloroprene rubber, silicone rubber, ethylene-propylene rubber, natural rubber, and styrene rubber can be used in place of the acrylonitrile-butadiene rubber in the sealant 29. As an alternative to using an elastomer, plating the gasket with tin, silver, or another metal also allows a better seal to be achieved. Specifically, as long as a better seal is achieved, there is no limit imposed on the materials constituting the sealant 29.

The action of the absorption coupling structure for a refrigeration circuit having the above construction will now be described with reference to FIGS. 5A and 5B.

Figure 5A:
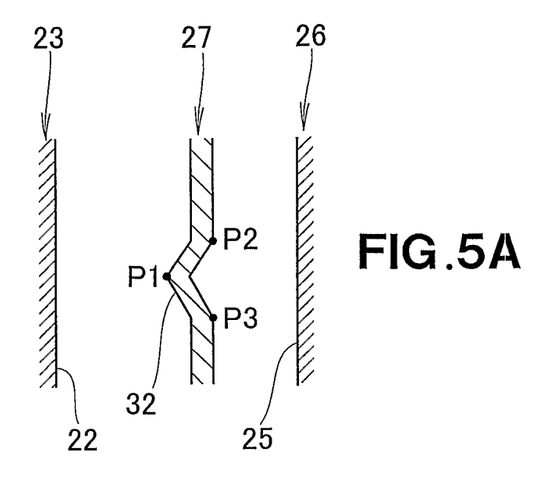
FIGS. 5A, 5B show an operation of the coupling structure according to the first embodiment.

As shown in FIG. 5A, an apex P1 of the protruding part 32 projects toward the coupling member 23 without being connected to the coupling members 23, 26. The skirt parts of the protruding part 32 are designated P2, P3.

The bolts 28 are used to fasten the resulting assembly, as shown in FIG. 2.

Figure 5B:
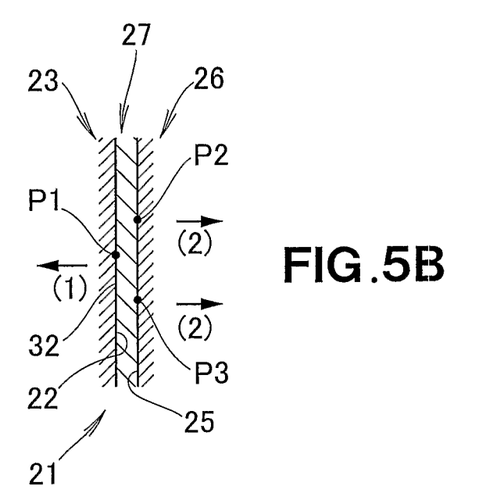

When the bolts 28 have been tightened, the coupling members 23, 26 and the protruding part 32 of the gasket 27 will be securely attached, as shown in FIG. 5B. The elastic force of the protruding part 32 causes a leftward force to be applied at P1 as shown by arrow (1) against the force received from the adjoining face 22, and a rightward force to be applied at P2 and P3 as shown by arrow (2) against the force received from the adjoining face 25. The coupling structure 21 will be sealed by the applied forces illustrated by arrows (1) and (2).

The protruding part 32 presses against the adjoining faces 22, 25, allowing fluid to be prevented from leaking. Fluid can be prevented from leaking as long as the gasket 27 to which the protruding part 32 has been provided is used. The protruding part 32 may be provided by pressing a metal plate or using other inexpensive means. Specifically, the coupling structure 21 can be manufactured inexpensively.

When the bolts are loosened, the elastic force causes the protruding part 32 to return to its original shape, as shown in FIG. 5A. The coupling structure 21 allows the gasket 27 to be used repeatedly, which is cost-effective.

Figure 6A:
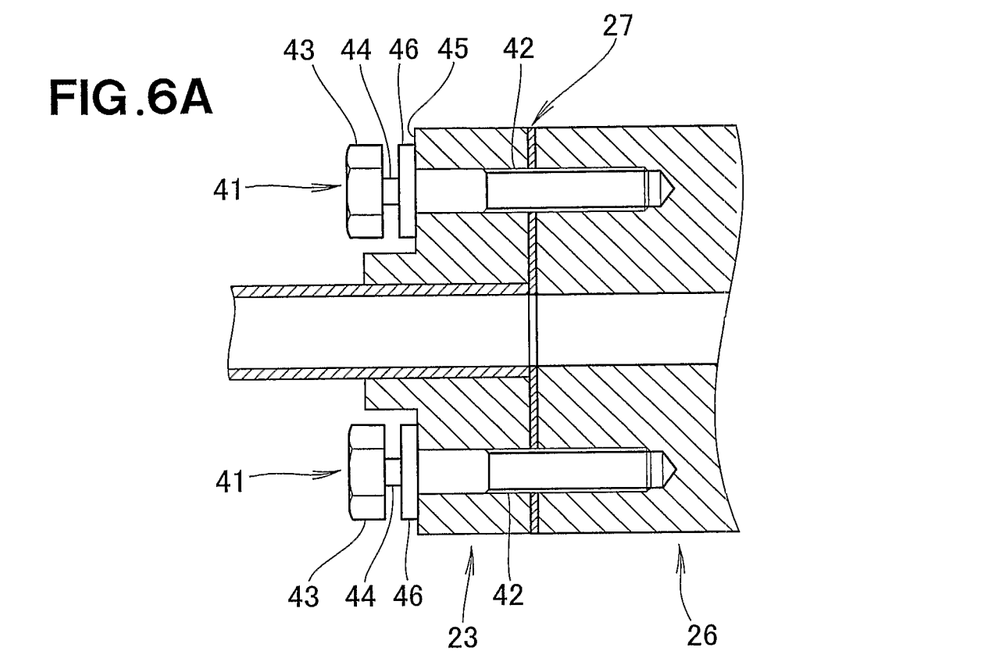
FIGS. 6A, 6B are cross-sectional views of the coupling structure according to a second embodiment of the present invention, showing a bolt with a weak part.
Figure 6B:
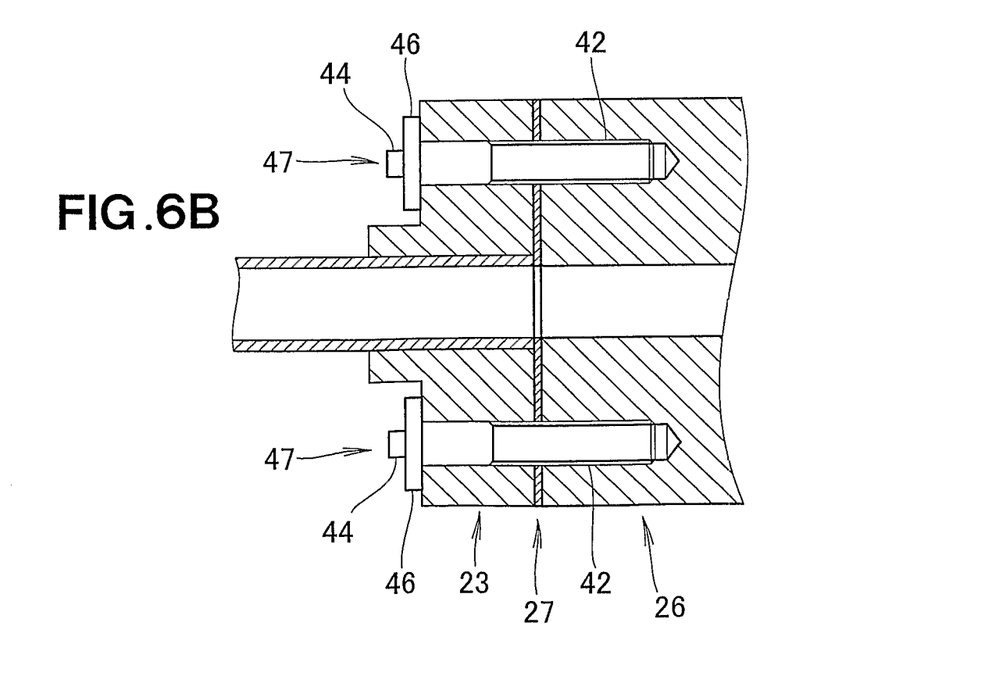

FIGS. 6A and 6B show a coupling structure of a second embodiment. The elements in common with the second embodiment are assigned the same reference numbers, and are not described in detail here. In the second embodiment, a bolt 41 that has a weak part is used in place of the bolt 28 of the second embodiment shown in FIG. 2.

As shown in FIG. 6A, the bolt 41 comprises a shaft part 42 with a male thread on one end, a bolt head 43 integrally formed on the other end of the shaft part 42, a weak part 44 provided to the shaft part 42 in the vicinity of the bolt head 43 and a flanged part 46 provided to the shaft part 42 between the weak part 44 and the thread, and locked onto an exterior surface 45 of the coupling member 23.

As the bolt 41 is tightened, the weak part 44 breaks when a predetermined fastening torque is reached, resulting in a bolt 47 without the bolt head 43 (FIG. 6A), as shown in FIG. 6B. With the bolt head 43 detached, the bolt 41 cannot be turned using a wrench or other ordinary tool, making it possible to obtain a coupling that cannot be removed without a particular, specialized tool. A coupling of this type is called a "permanent coupling." When a permanent coupling is used, the bolt 41 will not be turned unintentionally, and the coupling becomes more reliable. It is therefore desirable that the flanged part 46 be circular.

When the bolt head 43 has been tightened to the predetermined torque, the bolt 41 will break at the weak part. Specifically, the bolt 41 will be tightened at the predetermined torque.

The bolt 41 is generally tightened using a torque wrench; however, according to the present invention, the torque can be controlled without using a torque wrench.

The bolt 41 will be simple to tighten because a torque wrench does not have to be made available or put in place.

Figure 7:
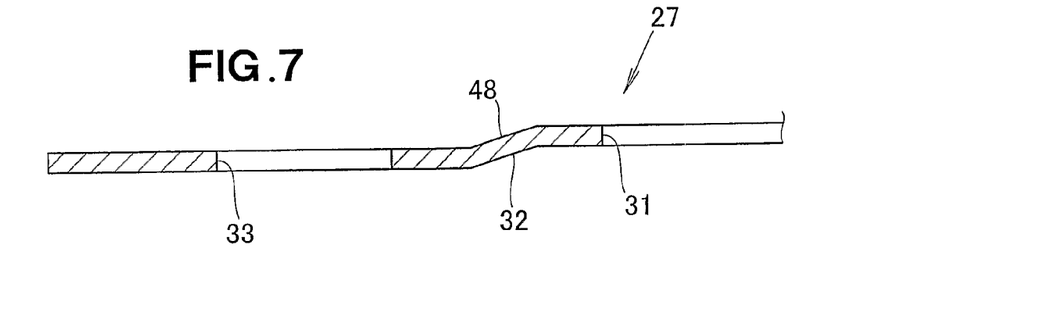
FIG. 7 is a partial cross-sectional view of a gasket according to a third embodiment of the present invention, showing a protruding part having a tapering surface.

FIG. 7 shows the gasket 27 of a third embodiment.

The protruding part 32 of the first embodiment shown in FIG. 4 is not "V"-shaped but tapered, having a tapering surface 48. Specifically, the through-hole 31 has been elevated.

Figure 8A:
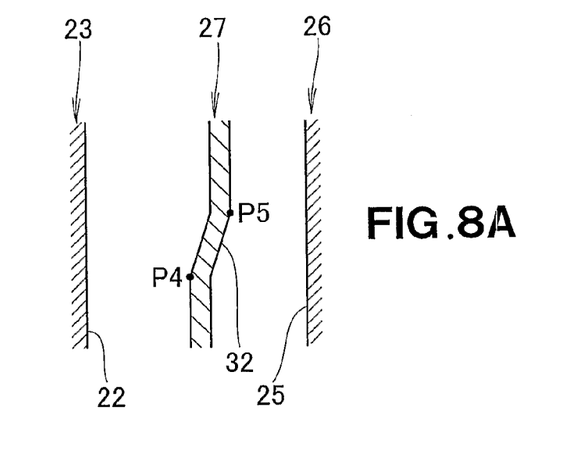

FIGS. 8A, 8B show the action of the coupling structure 21 of the third embodiment.

As shown in FIG. 8A, when the coupling members 23, 26 are not connected, one end P4 of the protruding part 32 projects toward the coupling member 23. The other end of the protruding part 32 is designated P5.

The bolts 28 (FIG. 2) are used to fasten the resulting assembly. When the bolts 28 have been tightened, the coupling members 23, 26 and the protruding part 32 of the gasket 27 will be securely attached, as shown in FIG. 8B. The elastic force of the protruding part 32 causes a leftward force to be applied at P4 as shown by arrow (3) against the force received from the adjoining face 22, and a rightward force to be applied at P5 as shown by arrow (4) against the force received from the adjoining face 25.

The coupling structure 21 will be sealed by the applied forces illustrated by arrows (3) and (4). Specifically, the coupling structure 21 can be sealed even if the protruding part 32 is configured in a tapering shape.

Even when the protruding part 32 is configured in a tapering shape, loosening the bolt 28 causes the elastic forces to return the protruding part 32 to its original shape, as shown in FIG. 8A.

In the abovementioned embodiments, the coupling structure of the present invention is applied to an expansion valve, but may also be used for connecting other structural components and pipe conduits.

Industrial Applicability

The coupling structure for an absorption refrigeration circuit, according to the present invention is suitable for creating a seal between structural components and pipe conduits.

The invention claimed is:

1. An absorption refrigeration circuit of an automotive vehicle, comprising:
   an expansion valve that causes a pressurized refrigerant to expand and depressurize;
   an evaporator that causes the depressurized refrigerant to absorb exterior heat and evaporate;
   an absorber that causes a refrigerant vapor generated by the evaporator to be absorbed by an absorbing solution;
   a heat exchanger to which the absorbent solution is fed from the absorber;
   a regenerator that heats the absorbent solution supplied from the heat exchanger using heat from a heater, causes the refrigerant to evaporate, and generates a heated refrigerant; and
   a condenser that discharges heat of the heated refrigerant to the outside of the automotive vehicle;
   a pipe conduit; and
   a coupling structure that connects the expansion valve to the pipe conduit, the coupling structure comprising:
   two coupling members;
   a gasket held between the two coupling members; and
   a plurality of bolts for joining the two coupling members together,
   wherein the coupling members have respective flat adjoining faces, and the gasket has first and second surfaces, the gasket comprising:
   a through-hole for allowing the refrigerant or absorbent solution to pass there-through;
   a protruding part for elastically deforming to a flat cross-section and pressing against the adjoining faces when clamped between the two coupling members so that entire surfaces of the first and second surfaces of the gasket are in contact with the flat adjoining faces of the coupling members, respectively, the protruding part encircling the through-hole; and
   a plurality of bolt holes disposed outside the protruding part for allowing the bolts to pass therethrough.

2. The absorption refrigeration circuit of claim 1, wherein each of the bolts comprises:
   a shaft part having a male thread formed on a first end thereof;
   a bolt head integrally formed on a second end of the shaft part opposite the first end;
   a weak part between the bolt head and the thread, the weak part being designed to break when the bolt is fastened at a predetermined torque; and
   a flanged part provided to the shaft part between the weak part and the thread, the flanged part locking onto an exterior surface of one of the two coupling members.

3. The absorption refrigeration circuit of claim 1, wherein the protruding part is V-shaped.

4. The absorption refrigeration circuit of claim 1, wherein the protruding part has a tapering surface.

5. The absorption refrigeration circuit of claim 1, wherein the gasket has a uniform thickness.

6. The absorption refrigeration circuit of claim 1, wherein the protruding part comprises a V-shaped protruding part protruded from the first surface of the gasket and a V-shaped depressing part depressed from the second surface of the gasket.

7. The absorption refrigeration circuit of claim 1, wherein the gasket has a uniform thickness and the protruding part comprises a V-shaped protruding part protruded from the first surface of the gasket and a V-shaped depressing part depressed from the second surface of the gasket.

8. The absorption refrigeration circuit of claim 1, wherein the gasket is formed of a metal gasket and sealants over the first and second surfaces of the metal gasket, the sealants comprising at least one selected from a group consisting of acrylonitrile-butadiene rubber, chloroprene rubber, silicone rubber, ethylene-propylene rubber, natural rubber, and styrene rubber.

9. The absorption refrigeration circuit of claim 1, wherein the protruding part is a V-shaped protruding part and a cross section of the V-shaped protruding part comprises a single apex and two skirt parts.

10. The absorption refrigeration circuit of claim 1, wherein the gasket is formed of a metal gasket and sealants over the first and second surfaces of the metal gasket, the sealants comprising metal plating.

11. The absorption refrigeration circuit of claim 10, wherein the metal plating is tin plating, silver plating, or a combination thereof.

12. The absorption refrigeration circuit of claim 1, wherein the absorption refrigeration circuit contains the refrigerant or the absorbent solution in the through-hole of the coupling structure and the pipe conduit.

13. An absorption refrigeration circuit of an automotive vehicle, comprising:
   an expansion valve that causes a pressurized refrigerant to expand and depressurize;
   an evaporator that causes the depressurized refrigerant to absorb exterior heat and evaporate;
   an absorber that causes a refrigerant vapor generated by the evaporator to be absorbed by an absorbing solution;
   a heat exchanger to which the absorbent solution is fed from the absorber;
   a regenerator that heats the absorbent solution supplied from the heat exchanger using heat from a heater, causes the refrigerant to evaporate, and generates a heated refrigerant; and
   a condenser that discharges heat of the heated refrigerant to the outside of the automotive vehicle;
   a pipe conduit; and
   a coupling structure that connects the expansion valve to the pipe conduit, the coupling structure, comprising:
   two coupling members;
   a gasket held between the two coupling members; and
   a plurality of bolts for joining the two coupling members together,
   wherein the coupling members have respective flat adjoining faces and the gasket has first and second surfaces, the gasket comprising:
   a through-hole;
   a protruding part deforming to a flat cross-section for pressing against the adjoining faces when clamped between the two coupling members so that entire surfaces of the first and second surfaces of the gasket are in contact with the flat adjoining faces of the coupling members, respectively; and a plurality of bolt holes disposed outside the protruding part for allowing the bolts to pass therethrough.

14. The absorption refrigeration circuit of claim 13, wherein the protruding part deforms into a flat sheet when the gasket is clamped between the two coupling members.

15. The absorption refrigeration circuit of claim 13, wherein the protruding part is V-shaped.

16. The absorption refrigeration circuit of claim 13, wherein the protruding part has a tapering surface.

17. The absorption refrigeration circuit of claim 13, wherein the gasket has a uniform thickness.

18. The absorption refrigeration circuit of claim 13, wherein the protruding part comprises a V-shaped protruding part protruded from the first surface of the gasket and a V-shaped depressing part depressed from the second surface of the gasket.

19. The absorption refrigeration circuit of claim 13, wherein the gasket has a uniform thickness and the protruding part comprises a V-shaped protruding part protruded from the first surface of the gasket and a V-shaped depressing part depressed from the second surface of the gasket.

20. The absorption refrigeration circuit of claim 13, wherein the protruding part is a V-shaped protruding part and a cross section of the V-shaped protruding part comprises a single apex and two skirt parts.

\* \* \* \* \*